United States Patent
Yamakura

(10) Patent No.: US 6,865,145 B2
(45) Date of Patent: Mar. 8, 2005

(54) RECORDING-MEDIUM OPERATING DEVICE, CLOCK SIGNAL GENERATING DEVICE AND METHOD FOR GENERATING CLOCK SIGNAL

(75) Inventor: Kenichi Yamakura, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 10/639,522

(22) Filed: Aug. 13, 2003

(65) Prior Publication Data

US 2004/0042365 A1 Mar. 4, 2004

(30) Foreign Application Priority Data

Aug. 28, 2002 (JP) ........................................ 2002-248672

(51) Int. Cl.[7] .............................................. G11B 7/00
(52) U.S. Cl. .................................. 369/47.28; 369/53.34
(58) Field of Search ........................ 360/51; 369/47.28, 369/47.29, 47.3, 47.35, 53.34

(56) References Cited

U.S. PATENT DOCUMENTS

| | | | | |
|---|---|---|---|---|
| 5,715,222 A | * | 2/1998 | Senshu et al. ........... | 369/47.28 |
| 6,104,682 A | * | 8/2000 | Konishi .................... | 369/44.34 |
| 6,385,150 B2 | * | 5/2002 | Asano ...................... | 369/47.28 |
| 2001/0006500 A1 | * | 7/2001 | Nakajima et al. ........ | 369/47.35 |
| 2002/0018415 A1 | * | 2/2002 | Kuroda et al. ........... | 369/47.28 |

* cited by examiner

Primary Examiner—W. R. Young
Assistant Examiner—D. Mercedes
(74) Attorney, Agent, or Firm—Arent Fox, PLLC

(57) ABSTRACT

It is intended to provide a recording-medium operating device, a clock signal generating device for the recoding-medium operating device, and a method for generating a clock signal for the recoding-medium operating device that satisfy both operation with a wide-range data transfer rate using delay line provided with not so large number of stages and high correction accuracy and are advantageous in terms of low power consumption and suppression of noises. A reference clock group $\emptyset 0$ through $\emptyset x$ different in phase are obtained by a PLL 1. One of the reference clock group is selected by a clock selector 2. A selected clock signal is inputted to a delay circuit 3 and one of output clocks from a delay line 31 is selected by a selector 3. With structure as such, selection by the clock selector 2 and the selector 3 is controlled so as to make phase difference between a clock signal and an RF signal minimum. Thereby, time equivalent to phase difference of adjoining two reference clocks is sufficient enough as total delay quantity of the delay line 31.

21 Claims, 15 Drawing Sheets

BLOCK CONFIGURATION DIAGRAM OF DISK OPERATION DEVICE DIRECTED TO FIRST EMBODIMENT

FIG. 1  BLOCK CONFIGURATION DIAGRAM OF DISK OPERATION DEVICE DIRECTED TO FIRST EMBODIMENT

BLOCK DIAGRAM SHOWING STRUCTURE OF PHASE LOCKED LOOP

FIG. 3  BLOCK DIAGRAM SHOWING STRUCTURE OF VOLTAGE CONTROL OSCILLATOR

TIMING CHART SHOWING EXAMPLE OF WAVEFORM OF PLL OUTPUT CLOCK

FIG. 5 BLOCK DIAGRAM SHOWING STRUCTURE OF DELAY LINE

DIAGRAM SHOWING SELECTION OF CORRECTION CLOCK BY SELECTOR

BLOCK DIAGRAM SHOWING STRUCTURE OF DELAY UNIT

BLOCK DIAGRAM SHOWING STRUCTURE OF DELAY UNIT

FIG. 9 BLOCK DIAGRAM SHOWING DELAY-VALUE MEASURING SECTION

DIAGRAM SHOWING CLOCK MARK AND DATA REGION ON DISK

GRAPH SHOWING RELATION OF RF SIGNAL AND CLOCK
( IN CASE THEIR PHASES MEET EACH OTHER )

GRAPH SHOWING RELATION OF RF SIGNAL AND CLOCK
( IN CASE THEIR PHASES DO NOT MEET EACH OTHER )

FIG. 13 TIMING CHART SHOWING CALIBRATION OF DELAY LINE

FIG. 14  BLOCK CONFIGURATION DIAGRAM OF DISK OPERATION DEVICE DIRECTED TO FIRST EMBODIMENT

DIAGRAM SHOWING SET VALUE FOR SWITCHING DELAY CIRCUITS

FIG. 16 BLOCK DIAGRAM SHOWING SELECTIVE-INPUT-TYPE DELAY LINE

BLOCK DIAGRAM SHOWING CONVENTIONAL DELAY LINE

RECORDING-MEDIUM OPERATING DEVICE, CLOCK SIGNAL GENERATING DEVICE AND METHOD FOR GENERATING CLOCK SIGNAL

CROSS-REFERENCE TO RELATED APPLICATIONS

This application is based upon and claims the benefit of priority from each of the prior Japanese Patent Application No. 2002-248672 filed on Aug. 28, 2002, the entire contents of which are incorporated herein by reference.

BACKGROUND OF THE INVENTION

1. Field of the Invention

The present invention relates to a recording-medium operating device and method for data operation such as data-write/data-read to recording media such as optical disks, magneto optical disks and the like used for computers, audio devices, video devices and the like and a method for operating a recording medium. More particularly, it relates to a recording-medium operating device capable of coping with a wide-range data transfer rate using delay circuit with not so large number of stages, a clock signal generating device for the recoding-medium operating device, and a method for generating a clock signal.

2. Description of Related Art

Data operation such as data-write, data-read, and the like to a recoding medium such as an optical disk (simply termed as "disk" hereinafter) is conducted along with clock signals for taking timing. As one of the manners for generating a clock signal, there can be raised external clock system wherein a clock signal is obtained by reproducing a clock mark that has previously been formed on a disk as a phase information mark.

Generation of a clock signal in accordance with external clock system is carried out as follow. Firstly, there will be described a reference clock mark on a disk. As shown in FIG. 10, FCM (Fine Clock Mark) and data regions are alternately arranged on a disk. An FCM herein corresponds to a clock mark. A segment consists of an FCM and a following data region. When laser beam is irradiated to an FCM, reflected laser beam generates a pulse signal. A necessary multiplication is made by a PLL (Phase-Locked Loop) based on the pulse signal, whereby, a reference clock is generated. Data operation for following data regions is carried out along with this reference clock.

In a typical disk operating device, processing for generating the above-mentioned reference clocks and data operation processing to data regions based on reference clocks are separately conducted by respective processing systems. Therefore, there is possibility that frequency difference and phase difference between a reference clock and data on a data region occur. Furthermore, individual differences of devices and disks themselves can possibly cause frequency difference or phase difference between a reference clock and data on a data region. Accordingly, it is required to meet timing of data on a data region with a reference clock. For such a reason, a phase of a reference clock is corrected.

Phase correction is conducted with a delay line as shown in FIG. 17. A delay line is consists of a significant number of buffer logics connected in series. Out of delay clocks outputted from respective adjoining buffer logics, a delay signal that has the smallest phase difference with a read signal is selected as a reference clock. A data correction pattern is previously recorded on a head portion of a data region on the disk shown in FIG. 10 and when a data correction pattern is read out, a read signal is obtained. Being sampled with read signals obtained by reference clocks, data Dn−1, Dn, Dn+1, . . . , as shown in FIG. 11, are obtained. Since the sample in FIG. 11 is a case without a phase difference, there is no difference between data Dn and its expected value En. However, in case with a phase difference, the data Dn may not coincide with the expected value En, as shown in FIG. 12. Thereby, it can be judged whether a phase of a read signal meets with a phase of a reference signal (Dn=En) or not meet, and further, ahead the reference signal (Dn>En) or behind the reference signal (Dn<En).

However, the above-mentioned prior art has following problems. That is, number of stages required for a delay line is too large. That is, delay quantity for the entirety of the delay line of FIG. 17 need to be taken longer than one-cycle of a reference clock. It should be noted that one-cycle of a reference clock is equivalent to a reciprocal of data-read speed from a disk (data-write speed is equal to data-read speed), a data transfer rate. Data transfer rate is not always constant due to subtle rotation speed fluctuation of a disk, inside/outside perimeter, and the like. Therefore, the delay line of FIG. 17 needs to secure total delay quantity that is same as or larger than one-clock cycle of a reference clock at the time of lowest data transfer rate.

For example, provided that lowest data transfer rate is 10 Mbps, minimum essential delay quantity is 100 ns. On the other hand, provided that delay quantity for one stage of a buffer logic (termed as correction accuracy hereinafter) in the delay line is 0.5 ns, the delay line needs two hundred stages of buffer logics. As correction accuracy is degraded, the delay line needs fewer stages. However, this sacrifices highly accurate phase synchronization in case of high data transfer rate. On the contrary, correction accuracy needs to be enhanced for high data transfer rate. Not to mention, enhancement of correction accuracy means increase of stages for the delay line. However, concerning a case of high data transfer rate, total delay quantity actually required can be achieved with a small number of stages in the delay line. This means the delay line has a large number of unnecessary circuits. As a result, power consumption is more than necessary.

Furthermore, if the number of stages in a delay line is excessively large, the fact itself is problematic. That is, if a circuit has delay lines with a very large number of stages, the circuit contains a significant number and varieties of clock signals that differ in phase within a narrow range. This causes large noises and as secondary phenomena, erroneous operation to circuits around the delay lines, and characteristic deterioration take place.

Furthermore, delay quantities of respective buffer logics that constitute a delay line are not always uniform. As the number of stages is larger, delay quantity variation among buffer logics affects operation of the delay line more seriously. In case variation among buffer logics is large, it is possible that actual delay quantity for a selected delay clock differs from desired delay quantity. Therefore, accurate phase correction cannot be made and frequency of corrections to approximate a desired phase increases. That is, it takes long for phase correction to converge. In case phase correction does not converge within a range of recorded phase correction patterns, a correction must be started from beginning. In such a case, a disk must be rotated many times to continue phase corrections.

SUMMARY OF THE INVENTION

The present invention has been made to solve the above-mentioned problems of the prior art. It is an object of the present invention to provide a recording-medium operating device, a clock signal generating device for the recoding-medium operating device, and a method for generating a clock signal for the recoding-medium operating device that satisfy both operation with a wide-range data transfer rate using delay line provided with not so large number of stages and high correction accuracy and are advantageous in terms of low power consumption and suppression of noises.

According to one aspect of the present invention, there is provided a clock signal generating device for generating a clock signal for data operation to a recording medium, the clock signal generating device comprising: a clock outputting circuit that outputs a plurality of clock signals that have same frequency but differ in phase one another, based on phase-information mark formed on a recording medium beforehand; a first selector that selects one of the plurality of the clock signals outputted from the clock outputting circuit; a delay circuit that receives an input of an clock signal selected by the first selector and has multi-level of delay quantity; a second selector that selects a delay quantity at the delay circuit; a phase-difference detecting section that detects phase difference between a signal reproduced from a data region on a recording medium and a clock signal; and a controlling section that controls selection by the first selector and selection by the second selector, wherein phase difference between delay quantities of the delay circuit is smaller than phase difference between clock signals of the clock outputting circuit, the controlling section controls selections by the first selector and the second selector so as to make phase difference detected at the phase-difference detecting section minimum, and a clock signal outputted from the delay circuit is utilized for data operation to a recording medium.

Furthermore, according to the one aspect of the present invention, there is provided clock signal generating method for generating a clock signal for data operation to a recording medium, the clock signal generating method comprising steps of: clock signal outputting step where a clock outputting circuit outputs a plurality of clock signals that have same frequency but differ in phase one another based on phase-information mark formed on a recording medium beforehand; clock-signal selecting step where a first selector selects one of the plurality of the clock signals outputted from the clock outputting circuit; delay step where a delay circuit having multi-level of delay quantity receives an input of an clock signal selected by the first selector and outputs a delayed signal with being selected a level of delay quantity by a second selector; phase-difference detecting step where a phase-difference detecting section detects phase difference between a signal reproduced from a data region on a recording medium and a clock signal; and controlling step where selection by the first selector and selection by the second selector are controlled to make phase difference detected at the phase-difference detecting section minimum, wherein a clock signal outputted from the delay circuit is utilized for data operation to a recording medium, and phase difference between delay quantities of the delay circuit is smaller than phase difference between clock signals of the clock outputting circuit.

Furthermore, according to the one aspect of the present invention, there is provided a recoding-medium operating device for data operation to a recording medium, the recording-medium operating device comprising: a clock outputting circuit that outputs a plurality of clock signals that have same frequency but differ in phase one another, based on phase-information mark formed on a recording medium beforehand; a first selector that selects one of the plurality of the clock signals outputted from the clock outputting circuit; a delay circuit that receives an input of an clock signal selected by the first selector and has multi-level of delay quantity; a second selector that selects a delay quantity at the delay circuit; a phase-difference detecting section that detects phase difference between a signal reproduced from a data region on a recording medium and a clock signal; and a controlling section that controls selection by the first selector and selection by the second selector, wherein phase difference between delay quantities of the delay circuit is smaller than phase difference between clock signals of the clock outputting circuit, the controlling section controls selections by the first selector and the second selector so as to make phase difference detected at the phase-difference detecting section minimum, and data operation to a recording medium is executed based on a clock signal outputted from the delay circuit.

In the present invention, the clock outputting circuit outputs a plurality of clock signals based on a phase-information mark formed on a recording medium beforehand. The plurality of the clock signals have same frequency but differ in phase one another. The first selector selects one of the plurality of the clock signals. A clock signal selected by the first selector is inputted to the delay circuit. The delay circuit works to delay an inputted clock signal. The delay circuit has multi-level of delay quantities and a second selector selects a delay quantity among them. On the other hand, the phase-difference detecting section detects phase difference of a signal reproduced from a data region on a recording medium and a clock signal. A clock signal outputted from the delay circuit is inputted to the phase-difference detecting section. After that, the controlling section controls selection of the first selector and the second selector so as to make phase difference minimum. Thereby, a clock signal correction is made. There is little phase difference between a thus corrected clock signal and a signal reproduced from a data region on a recording medium. Therefore, data operation to a recording medium is carried out based on a corrected clock signal.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will be described by referring to drawings as attached. In the embodiments, there are embodied disk operation devices that conduct data-write and data-read (termed as data operation hereinafter) on an optical disk such as a compact disk and the like. In the embodiments, a fixed pattern (2T) for "0011", is used as a phase correction pattern.

[First Embodiment]

Figure 1:
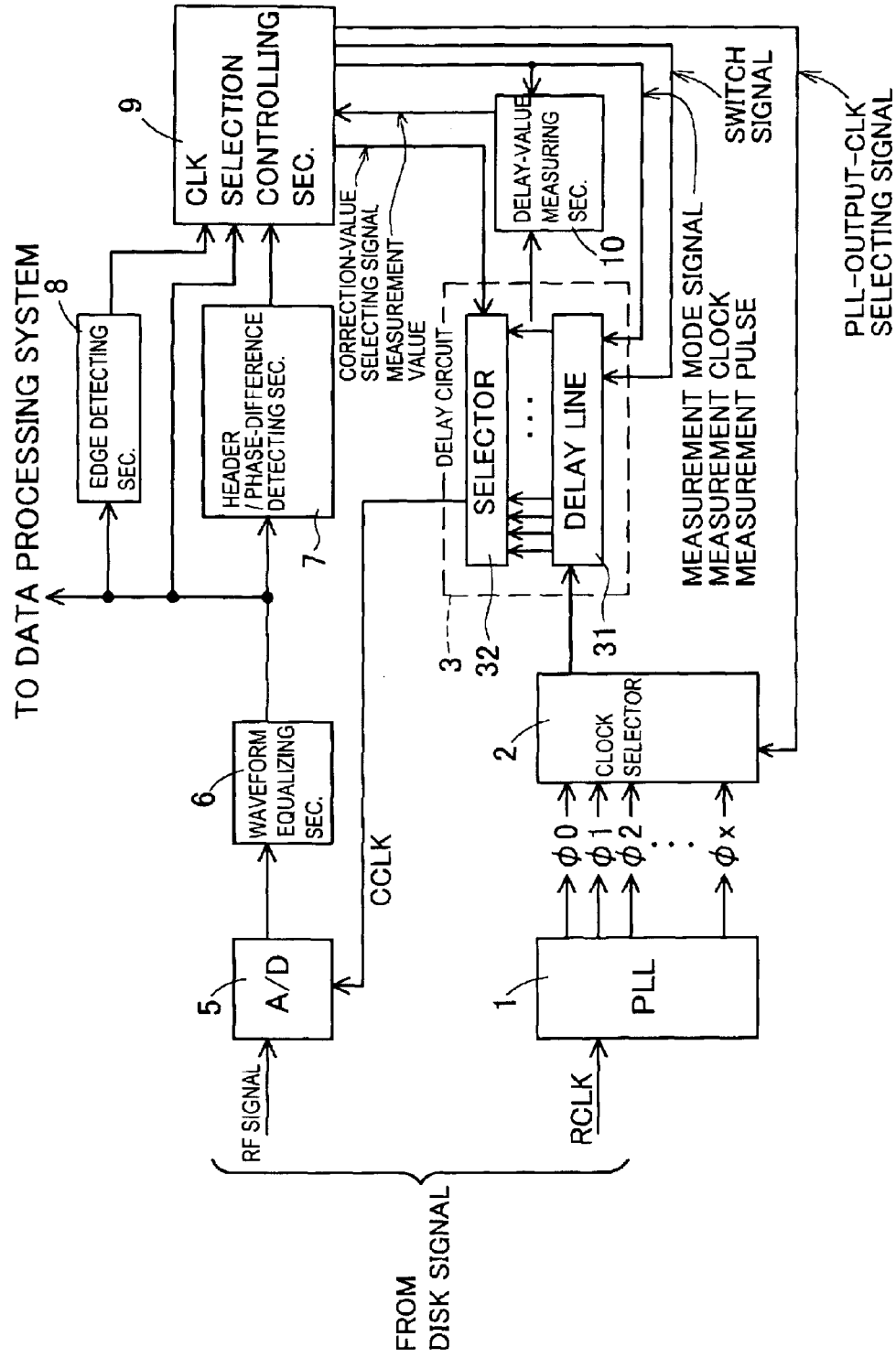
FIG. 1 is a block configuration diagram of disk operation device directed to first embodiment.

A disk operation device directed to a first embodiment is structured as shown in FIG. 1. That is, the disk operation device of this embodiment includes: a PLL 1 that receives an input of reference clock RCLK and generates a reference clock group Ø0 through Øx equivalent to multiplied reference clocks RCLK; a clock selector 2 that selects one of the reference clock group Ø0 through Øx outputted from the PLL1; and a delay circuit 3 that receives a clock from the clock selector 2 and outputs a corrected clock CCLK. The delay circuit 3 is constituted by a delay line 31 and a selector 32.

The disk operation device further includes: an A/D converting section 5 that receives an RF signal and corrected clock CCLK and samples out digital data from the RF signal; a waveform equalizing section 6 that equalizes waveform of an output from the A/D converting section 5; a header/phase-difference detecting section 7 that detects a phase correction pattern from a signal waveform of which has been equalized as well as phase difference to a corrected clock CCLK, an edge detecting section 8 that detects an edge of an signal by decoding and binarizing the signal waveform of which has been equalized; a clock-selection controlling section 9 that controls clock section by the clock selector 2 and the selector 32; and delay-value measuring section 10 that measures an actual delay value at the delay line 31 in the delay circuit 3.

Figure 2:
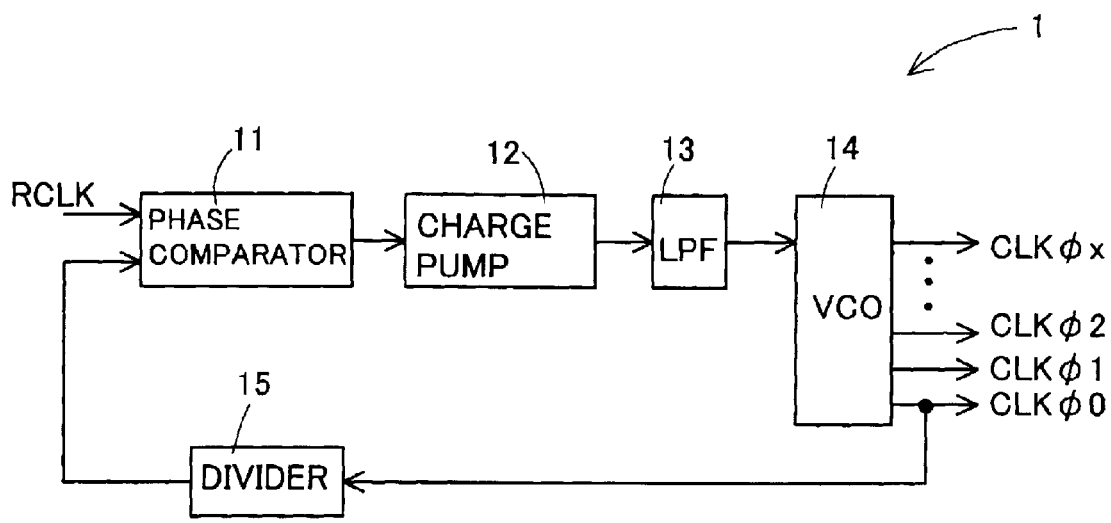
FIG. 2 is a block diagram showing structure of phase locked loop.
Figure 3:
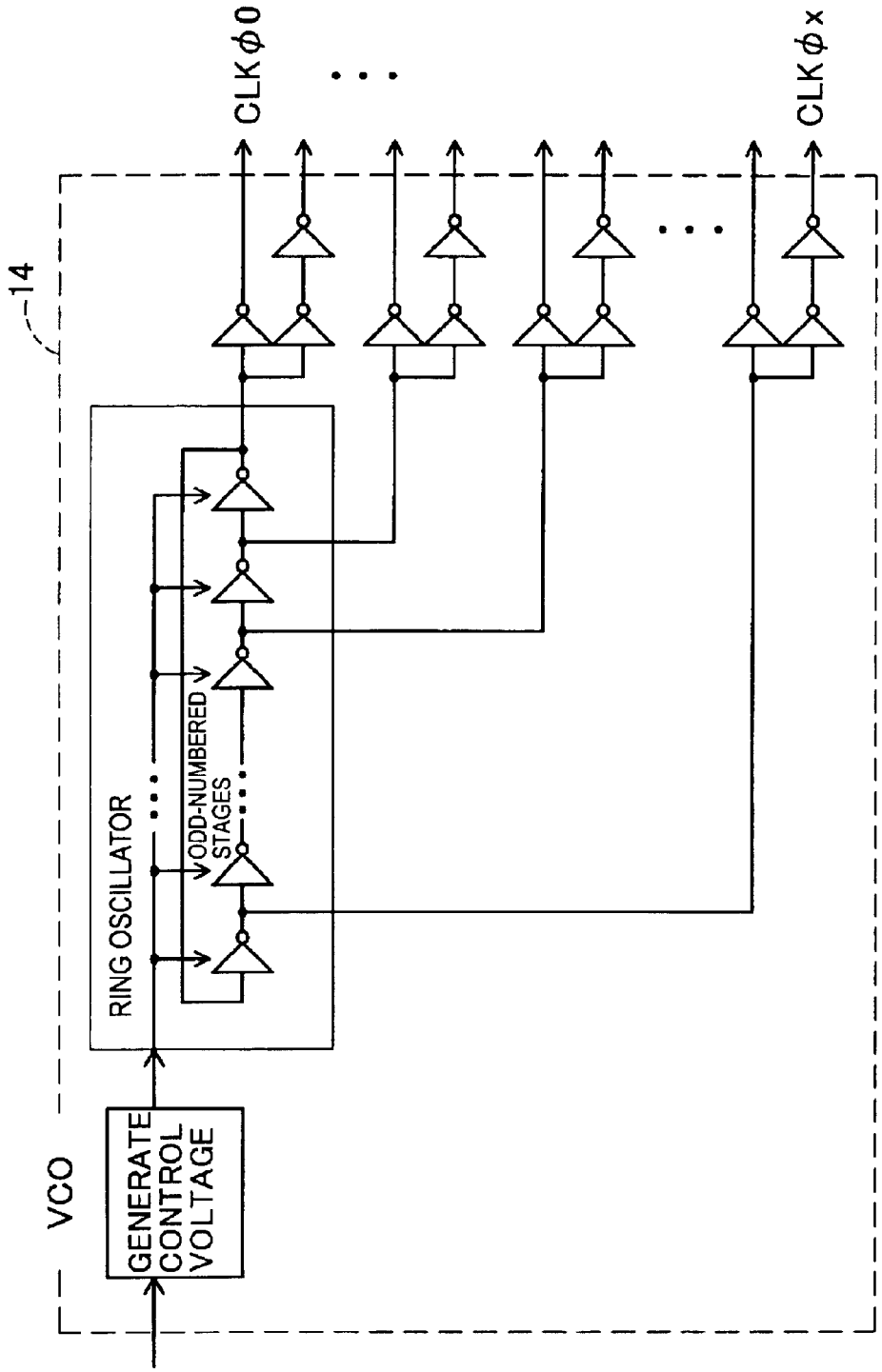
FIG. 3 is a block diagram showing structure of a voltage control oscillator.
Figure 4:
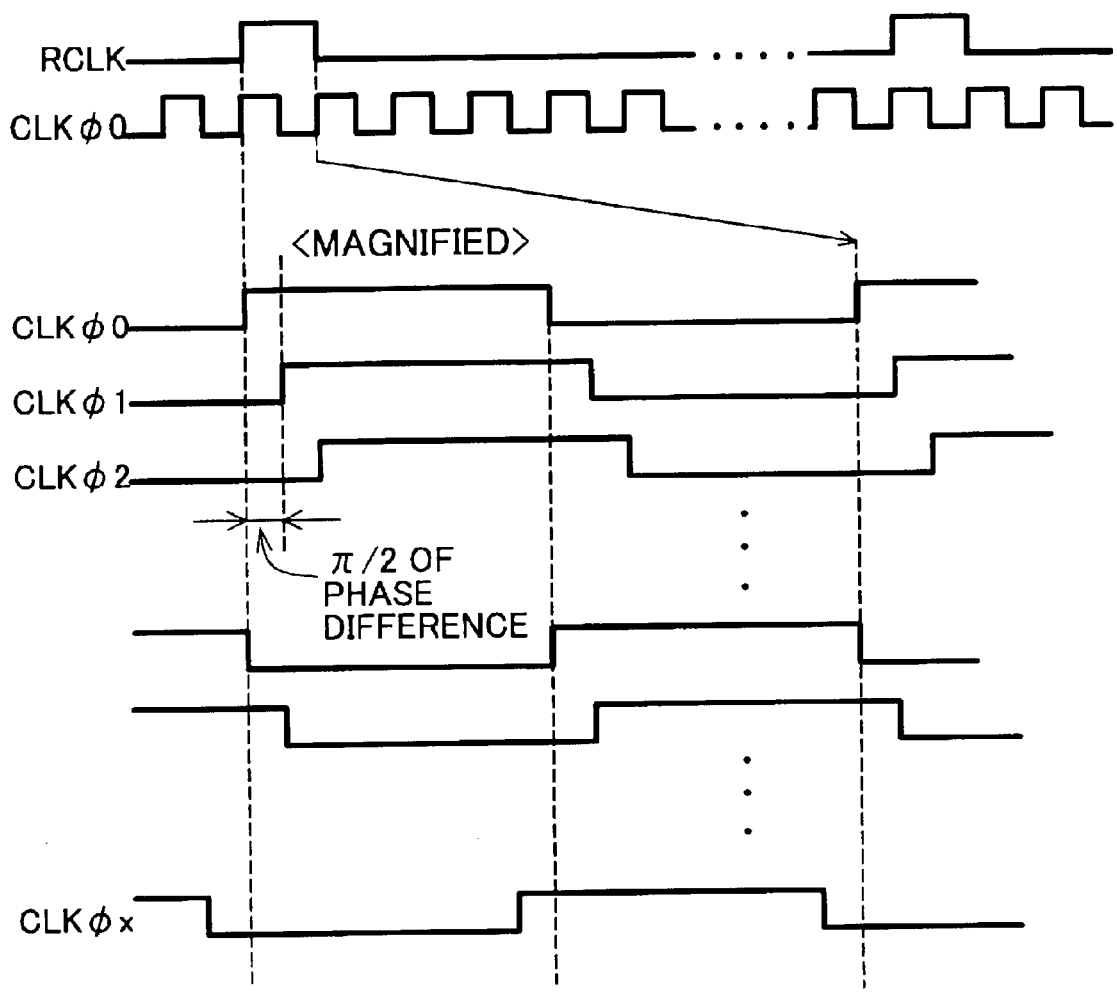
FIG. 4 is a timing chart showing an example of waveform of PLL output clock.

As shown in a block diagram of FIG. 2, the PLL 1 includes: a phase comparator 11; a charge pump 12; a low pass filter 13; a voltage control oscillator 14; and a divider 15. As shown in FIG. 3, the voltage control oscillator 14 is constituted by a ring oscillator wherein odd-numbered inverters are arranged in a manner of ring connection. In the voltage control oscillator 14, an output of each inverter is obtained and an inversed output of each is generated. Thereby, there are obtained clock outputs as twice as the number of the inverters in the ring oscillator. As shown in a timing chart of FIG. 4, each clock to be outputted differs by $\pi/2m$ from CLK Ø0 provided that the number of the inverters is m. That is, these are reference clock group Ø0 through Øx (x=2m-1). A reference clock RCLK to be inputted to the PLL 1 is generated from a fine clock mark on a disk.

Figure 5:
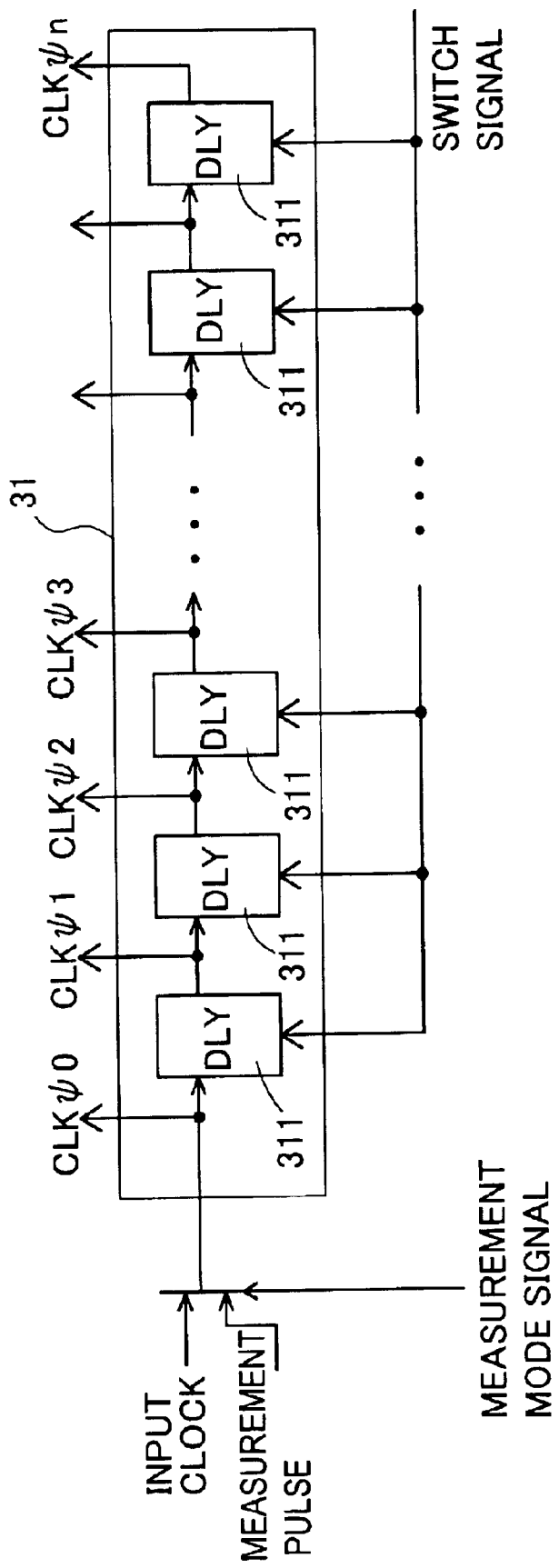
FIG. 5 is a block diagram showing structure of a delay line.
Figure 6:
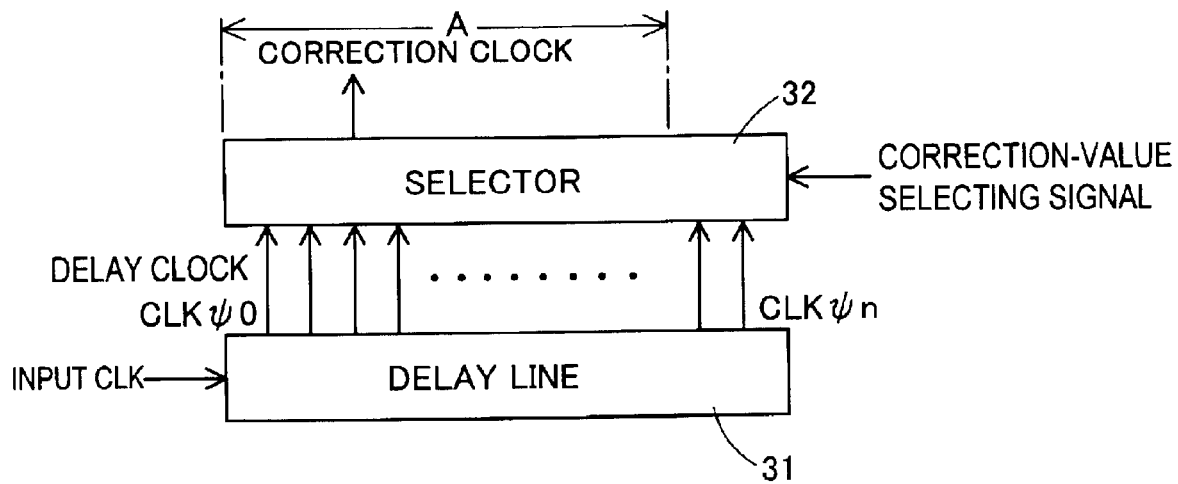
FIG. 6 is a diagram showing selection of correction clock by a selector.

As shown in FIG. 5, a delay line 31 in a delay circuit 3 is constituted by significant number of delay units 311 connected in series. Thereby, delay clocks CLK ψ0 through ψn are outputted from each intermediate portion of adjoining delay units 311 and both ends of each delay line 31. Total delay quantity of delay clocks CLK ψ1 through ψn-1 is enough if it is same as or more than a time difference corresponding to a phase difference of two adjoining reference clocks among the reference clock signal group Ø0 through Øx outputted from the PLL 1, i.e., $\pi/2m$. However, since the time difference differs depending on data transfer rate, a time difference for the lowest data transfer rate must be secured. Accordingly, in case it is not the lowest data transfer rate, only a restricted range as indicated with an arrow A in FIG. 6 is actually used. The range of the arrow A corresponds to a phase difference of two adjoining reference clocks. Furthermore, delay quantity of one-staged delay unit 311 corresponds to correction accuracy. Still further, out of delay clocks, the one selected by the selector 32 corresponds to correction clock CCLK. A clock selected by the clock selector 2 and a measurement pulse from the clock-selection controlling section 9 are selectively inputted to the delay line 31. Selection of those is switched by a measurement mode signal from the clock-selection controlling section 9. A clock selected by the clock selector 2 is ordinarily selected whereas a measurement pulse is selected only when a delay value is measured.

Figure 7:
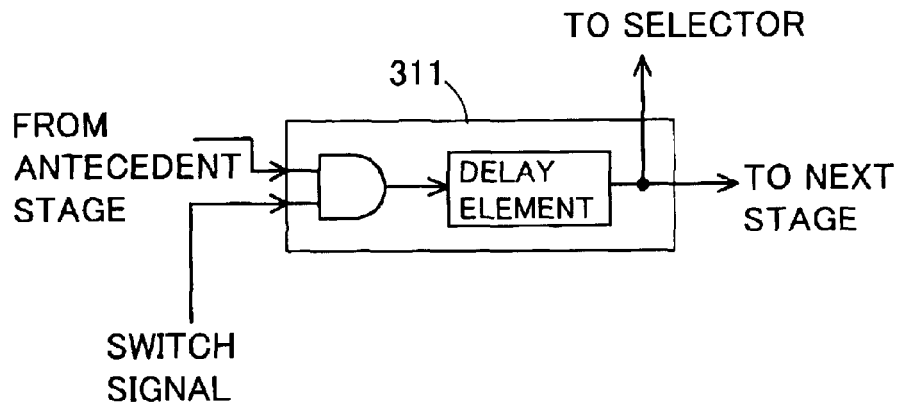
FIG. 7 is a block diagram showing structure of delay unit.
Figure 8:
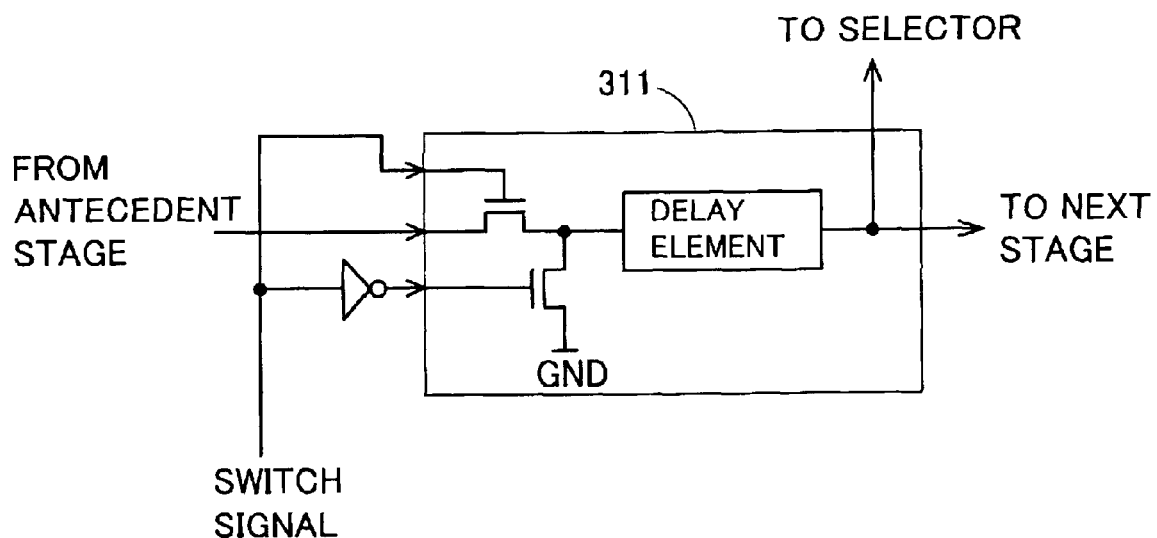
FIG. 8 is a block diagram showing structure of delay unit.

As shown in FIG. 7, each delay unit 311 is structured such that an AND gate is arranged as a switch element at the antecedent stage of a delay element. Like a resistance element or a buffer logic, a delay element is to output a signal delayed by a certain time with reference to an input signal. A clock signal from a delay unit 311 of an antecedent stage and a switch signal from the clock-selection controlling section 9 are inputted to the AND gate. That is, depending on a value of the switch signal, there are switched between ON state where a clock signal from an antecedent stage is transmitted to the delay element and OFF state where an output from the delay element is fixed without clock signal being transmitted there. It should be noted that switch signals are outputted from the clock-selection controlling section 9 to switch elements of delay units of respective stages. Furthermore, an output from a delay element is inputted to the selector 32 and a delay unit of next stage. An output to the selector 32 corresponds to a delay clock. It should be noted that an output from a delay unit 311 of final stage in the delay line 31 is inputted to only the selector 32. Though FIG. 7 shows an example of a delay unit 311 that employs an AND gate as a switch element, a switch element is not limited to an AND gate. As shown in FIG. 8, a MOS transistor can be employed alternatively.

Figure 9:
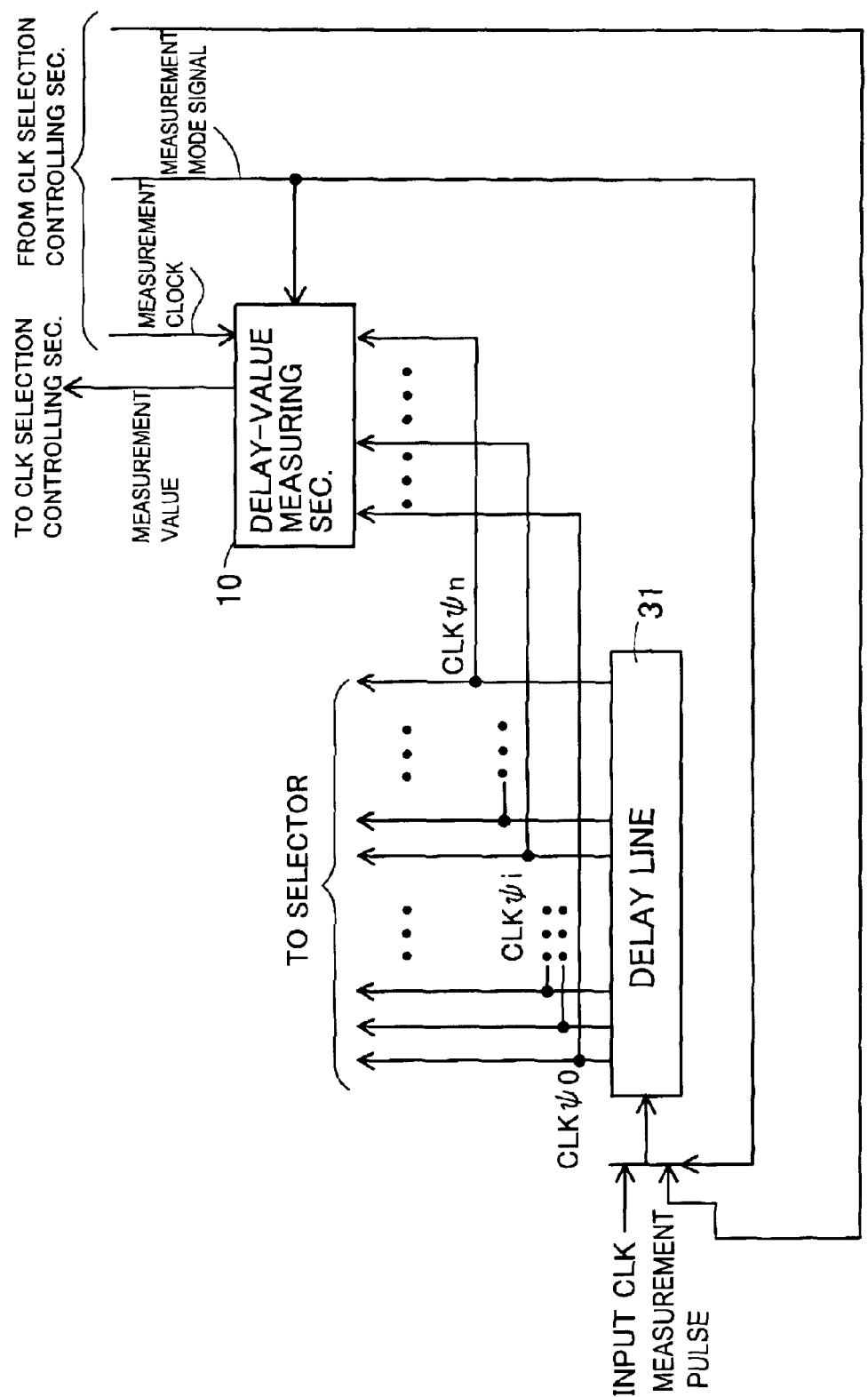
FIG. 9 is a block diagram showing delay-value measuring section.

As shown in FIG. 9, a delay-value measuring section 10 receives outputs from respective delay elements of the delay line 31, i.e., a delay clock group ψ0 through ψn, and a measurement mode signal and a measurement clock both outputted from the clock-selection controlling section 9. Furthermore, a measurement value for a delay value is outputted to the clock-selection controlling section 9.

Figure 10:
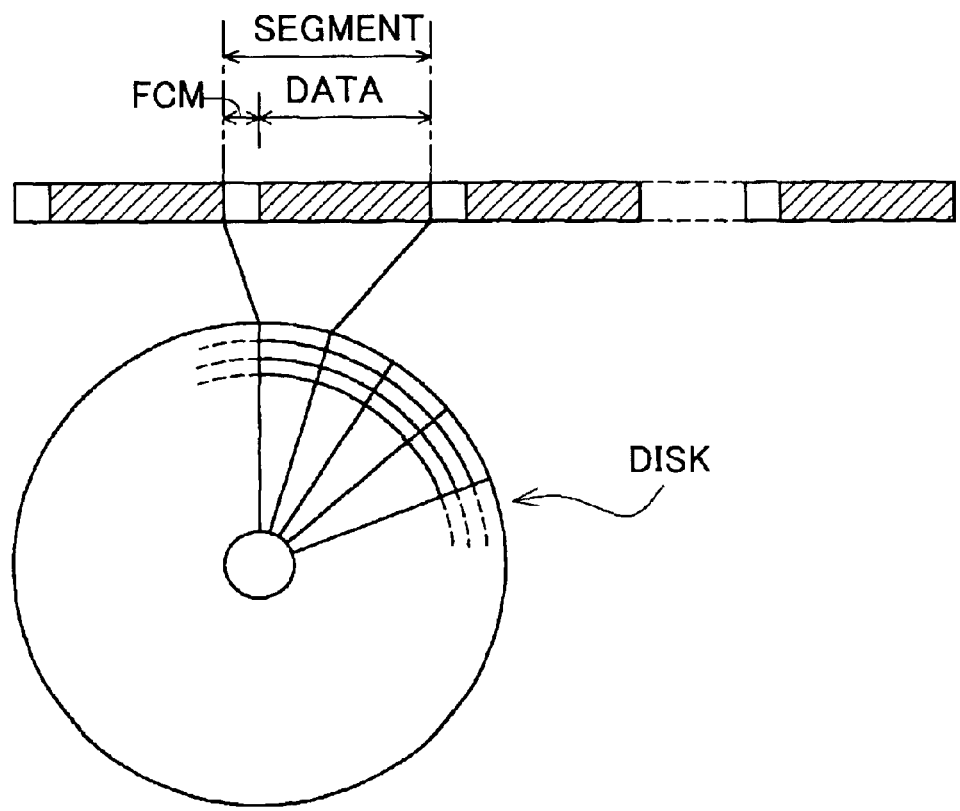
FIG. 10 is a diagram showing a clock mark and a data region on a disk.

Operation of a disk operation device directed to the first embodiment will be described. The operation of the present disk operation device is characterized by generation and correction of a timing signal for data operation on a disk. Therefore, description will be focused on generation and correction of a timing signal. This disk operation device applies external clock system where a timing signal is generated based on an FCM (see FIG. 10) previously formed on a disk. A reference clock RCLK to be inputted to the PLL 1 shown in FIG. 1 and FIG. 2 is obtained by irradiating laser beam on an FCM. Receiving an input of a reference clock RCLK, the PLL 1 generates a reference clock group Ø0 through Øx by multiplying the reference clock RCLK. The reference clock group Ø0 through Øx generated at the PLL 1 are inputted to the clock selector 2. The clock selector 2 selects one from the reference clock group Ø0 through Øx and outputs it to the delay circuit 3. Selection of a reference clock is determined by a PLL-output-CLK selecting signal from the clock-selection controlling section 9.

A measurement mode signal from the clock-selection controlling section 9 controls such that, instead of a measurement pulse, a clock signal should be inputted to the delay line 31 in the delay circuit 3. Therefore, a reference clock selected at the selector 2 is inputted to the delay line 31. Furthermore, a switch signal from the clock-selection controlling section 9 sets switch elements of all of the delay units 311 in the delay line 31 ON state. Therefore, delay clock group ψ0 through ψn slightly different in phase among them are outputted by function of each delay unit 311 in the delay line 31. The delay clock group ψ0 through ψn are inputted to the selector 32. The selector 32 selects one of the inputted delay clock group ψ0 through ψn. The selection is determined by a correction-value selecting signal from the clock-selection controlling section 9. A clock selected by the selector 32 corresponds to a correction clock CCLK.

A correction clock CCLK is inputted to the A/D converting section 5. In addition to a correction clock CCLK, an analog RF signal read out from a data region on a disk is also inputted to the A/D converting section 5. The A/D converting section 5 samples out a digital value from an RF signal along with timing made by a correction clock CCLK. That is, the A/D converting section 5 makes use of a correction clock signal CCLK as a timing signal. A sampled digital value is transmitted to the header/phase-difference detecting section 7 through the waveform equalizing section 6. When the header/phase-difference detecting section 7 detects an RF signal as a signal that derives from a phase correction pattern provided at a head portion in a data region, it detects phase difference of a correction clock signal CCLK and an RF signal.

Figure 11:
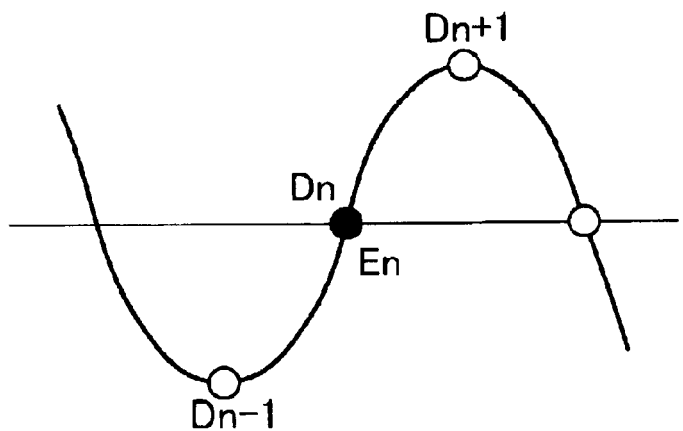
FIG. 11 is a graph showing relation of an RF signal and a clock (in case their phases meet each other)
Figure 12:
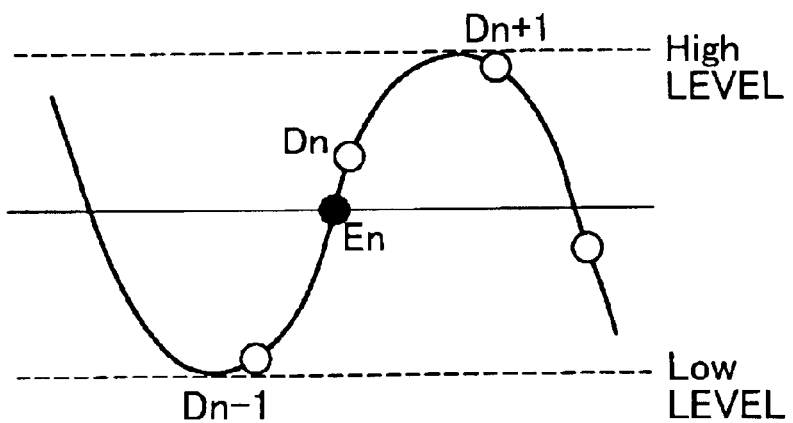
FIG. 12 is a graph showing relation of an RF signal and a clock (in case their phases do not meet each other)

In this embodiment, it is provided that a phase correction pattern is 2T pattern for "0011". In this case, a reproduced RF signal has sine wave. Therefore, in case a phase of a correction clock CCLK and that of an RF signal coincide with each other, as shown in FIG. 11, there can be obtained data Dn−1, Dn, Dn+1 as sampled values. Data Dn of such case is equal to an expected value En. However, in case there is phase difference between them, as shown in FIG. 12, data Dn and an expected value En does not coincide with each other. The header/phase-difference detecting section 7 obtains phase difference and phase difference direction between a correction clock CCLK and an RF signal based on the comparison result.

Phase difference is calculated as follows. Provided that Low level and High level in FIG. 11 and FIG. 12 are 00hex and 7Fhex, respectively, and center level is 40hex, level difference Δn between data Dn and an expected value En has a value within a range between −40hex and 3Fhex. Time for an RF signal to reach 7Fhex from 00hex corresponds to two cycles of a clock (in FIG. 11, Dn−1 to Dn+1). Thereby, phase difference between a correction clock CCLK and an RF signal can be obtained from an absolute value of Δn. Specifically, phase difference is $|2\pi/\Delta n|$. Furthermore, phase difference direction can be calculated from a notation of An and adjoining values of Dn−1 and Dn+1 that sandwich the value n. In case either Dn−1 or Dn+1 Dn is closer to an expected value En than Dn, "n" for a sampled value is newly assigned and what is closest to the expected value En is defined as Dn. Furthermore, it is possible to calculate phase difference within a range where an RF signal is linear by providing an offset for both Low level and High level based on amplitude of an RF signal and an effective range for A/D conversion.

In the present disk operation device, clock correction basically takes two steps: a first step where the clock selector 2 selects one reference clock from a reference clock group Ø0 through On outputted from the PLL 1; and a second step where the selector 32 selects one delay clock from a delay clock group ψ0 through ψn outputted from the delay line 31 in the delay circuit 3. A number of specific methods of clock correction are conceived and the following methods (1) through (4) can be raised, as examples: (1) a method to select a reference clock such that an absolute value of phase difference between a clock and an RF signal is minimum, in the first step; (2) a method to select a reference clock phase of which is the closest to forwarding angle side for an RF signal, in the first step; (3) a method to select a reference clock phase of which is the closest to backward angle side for an RF signal, in the first step; and (4) a method to select a reference clock preceding to a reference clock of which absolute value of phase difference between a clock and an RF signal is minimum, in the first step.

In case of (1), initial selection by the selector 32 in the delay circuit 3 is one that is around the center of the arrow A region in FIG. 6, whereby the first step is executed. In the first step, initial selection by the clock selector 2 is designated to a reference clock Ø0. Among the reference clock group Ø0 through Øx, there is determined a reference clock an absolute value of phase difference with reference to an RF signal of which is minimum, based on a result of a phase difference detection. Selection by the clock selector 2 is changed depending on a determination result. Thereby, a reference clock an absolute value of phase difference with reference to an RF signal of which is minimum is inputted to the delay circuit 3.

The second step is executed with above such situation. In the second step, selection by the selector 32 is set off by one stage depending on a result of phase difference detection. That is, in case a delay clock is ahead of an RF signal, a delay clock one stage posterior to the currently selected delay clock is selected. In case a delay clock is behind an RF signal, a delay clock one stage prior to the currently selected delay clock is selected. Selections such as the above manner are repeated so that phase difference between a delay clock and an RF signal can converge at zero or lower than correction accuracy of the delay line 31. There are two reasons why selection by the selector 32 is set off by one stage in the second step. The first reason is that delay quantity of each delay unit 311 is not completely uniform but has some diversity. The second reason is that phase of an RF signal and data transfer rate are not always constant but fluctuate to some extent. That is, selection of delay clock should be set off by one stage, otherwise selection goes ahead too much. It is allowable while phase difference is large, selection is set off by several stages and when phase difference comes to small, selection is set off by one stage.

In case of (2), initial selection by the selector 32 in the delay circuit 3 is one that is around the left end of the arrow A region in FIG. 6. What is selected is not a delay clock ψ0, the very initial one, but several stages ahead the delay clock ψ0. This is because there is variation of correction accuracy and fluctuation of an RF signal such as mentioned in the above. After the initial selection, the first step is executed. In the first step, among a reference clock group Ø0 through Øx, a reference clock phase of which is the closest to forwarding angle side for an RF signal is selected. The second step is executed with this state. In the second step, while phase difference is detected, selection by the selector 32 is set off backward by one stage. Thereby, phase difference between a delay clock and an RF signal can converge at zero or lower than correction accuracy of the delay line 31.

In case of (3), initial selection by the selector 32 in the delay circuit 3 is one that is around the right end of the arrow A region in FIG. 6. After the initial selection, the first step is executed. In the first step, among a reference clock group Ø0 through Øx, a reference clock phase of which is the closest to backward angle side for an RF signal is selected. The second step is executed with this state. In the second step, while phase difference is detected, selection by the selector 32 is set off forward by one stage. Thereby, phase difference between a delay clock and an RF signal can converge at zero or lower than correction accuracy of the delay line 31.

In case of (4), initial selection by the selector 32 in the delay circuit 3 is a delay clock ψ0, the very initial one. After the initial selection, the first step is executed. In the first step, among a reference clock group Ø0 through Øx, a reference clock preceding to a reference clock of which an absolute value of phase difference with reference to an RF signal is minimum is selected. After that, selection by the selector 32 in the delay circuit 3 is changed. A delay clock newly selected has a delay quantity corresponding to a phase difference of two adjoining reference clocks among the reference clock signal group Ø0 through Øx with reference to a delay clock signal ψ0, i.e., π/2m. Thereby, phase of an output clock from the delay circuit 3 is quite close to phase of a reference clock of which an absolute value of phase difference with reference to an RF signal is minimum. State as such is initial state of the second step herein. In the second step, selection by the selector 32 is set off by one stage depending on a result of phase difference detection. Thereby, phase difference between a delay clock and an RF signal can converge at zero or lower than correction accuracy of the delay line 31.

As a result, there can be obtained a correction clock signal CCLK phase of which meets with that of an RF signal. Data operation to a data region on a disk (see FIG. 10) is conducted along with the correction clock CCLK as a timing signal. Furthermore, when phase correction completes, the clock-selection controlling section 9 changes switch signals to a delay line 31 in the delay circuit 3. That is, this is to set a switch element of a delay unit 311 nearest after an output point of a delay clock finally selected OFF state. This is because it is not necessary to transmit a clock to a portion ahead the delay line 31. Thereby, excessive power consumption can be avoided. Furthermore, excessive saturation of clock signals within a circuit can be avoided, as well.

During data operation, the above-described clock correction processing is conducted every time of phase correction pattern detection. Thereby, phase difference between a timing signal and an RF signal is controlled always not to exceed correction accuracy of a delay line 31.

Figure 13:
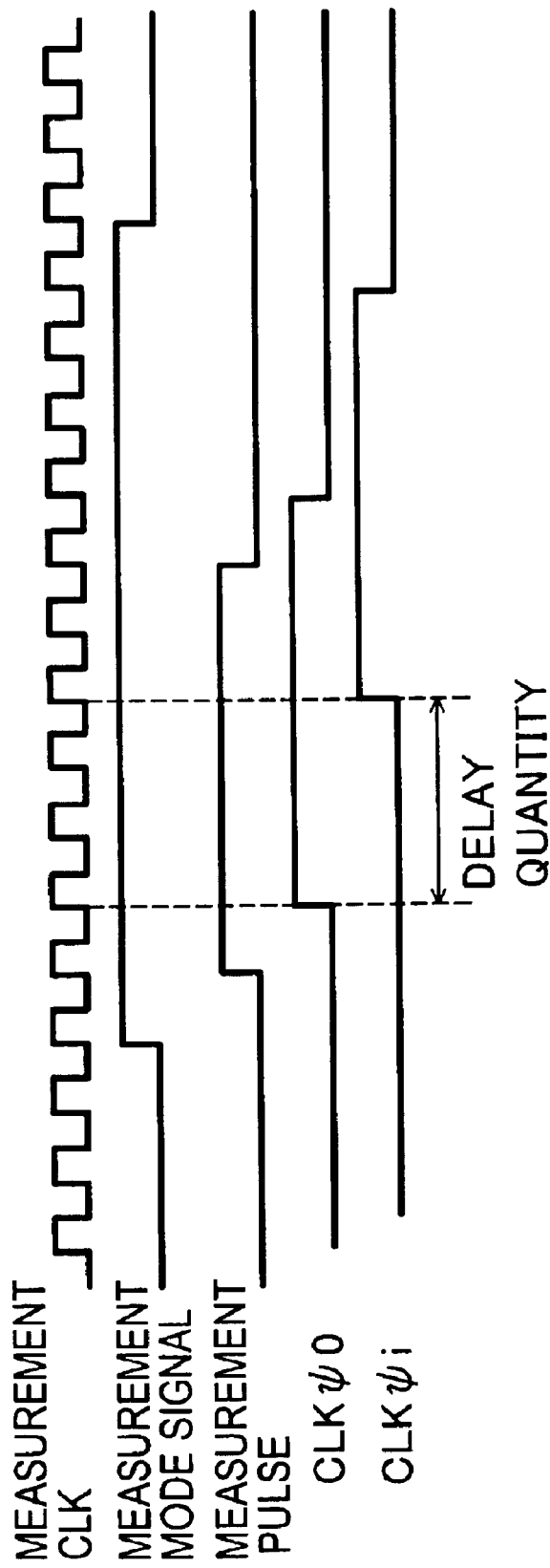
FIG. 13 is a timing chart showing calibration of a delay line.

In the disk operation device of this embodiment, the delay-value measuring section 10 conducts calibration of actual delay quantity directed to a delay line 31 in the delay circuit 3. Calibration is conducted as follows. When calibration is conducted, a measurement mode signal from the clock-selection controlling section 9 is changed to a signal that shows a calibration mode. Thereby, instead of a clock input from the clock selector 2, a measurement pulse is inputted to the delay line 31 (see FIG. 5 and FIG. 9). Time difference of output signals from the delay line 31 is measured under such condition. For example, in case delay quantity between a clock CLK ψ0 and a clock CLK ψi is measured, time difference between rinsing of the clock CLK ψ0 and that of the clock CLK ψi with reference to measurement pulses is measured, as shown in FIG. 13. Specifically, number of measurement clocks within the time difference is counted. Time differences between arbitrarily selected 2 points are measured, whereby calibration of delay quantity with respect to each delay unit 311 is conducted. Measured values are transmitted to the clock-selection controlling section 9.

In the clock-selection controlling section 9, measured delay quantity of each delay unit 311 is fedback to subsequent correction processing. For example, a measured delay quantity makes it possible to exactly grasp a range of a delay line 31 actually used depending on data transfer rate (the arrow A range shown in FIG. 6). Thereby, clock signals can be controlled not to be transmitted to a portion ahead the subject range. That is, a switch element of delay unit 31 that comes first just after the subject range is set off by a switch signal. Thereby, power consumption and the like are reduced. Furthermore, a second step subsequent to clock correction is conducted in accordance with thus measured delay quantity. Therefore, even if there is variation of delay quantity among delay units 311 to some extent, the variation does not affect convergence characteristic of clock correction.

The above-described calibration is conducted when a reference is set initially and when data transfer rate significantly fluctuates. For example, when power is turned on, when a disk is inserted, when a disk is sought, when track-jump on a disk is conducted, and the like. Furthermore, other than the above cases, calibration can be set with every constant length of interval arbitrarily set.

The disk operation device of the present embodiment can conduct clock correction within a data region on a disk by using user data other than phase correction pattern. That is, when a signal reproduced from user data is converted into a binary value, the binary-valued signal naturally includes edges "0"→"1" or "1"→"0". Accordingly, what is necessary is to just detect edges such as above by using the edge detecting section 8. Using the detected edges, data comparison shown in FIG. 11 or FIG. 12 can be conducted. Therefore, phase correction for entirety of data region can continue.

[Second Embodiment]

Figure 14:
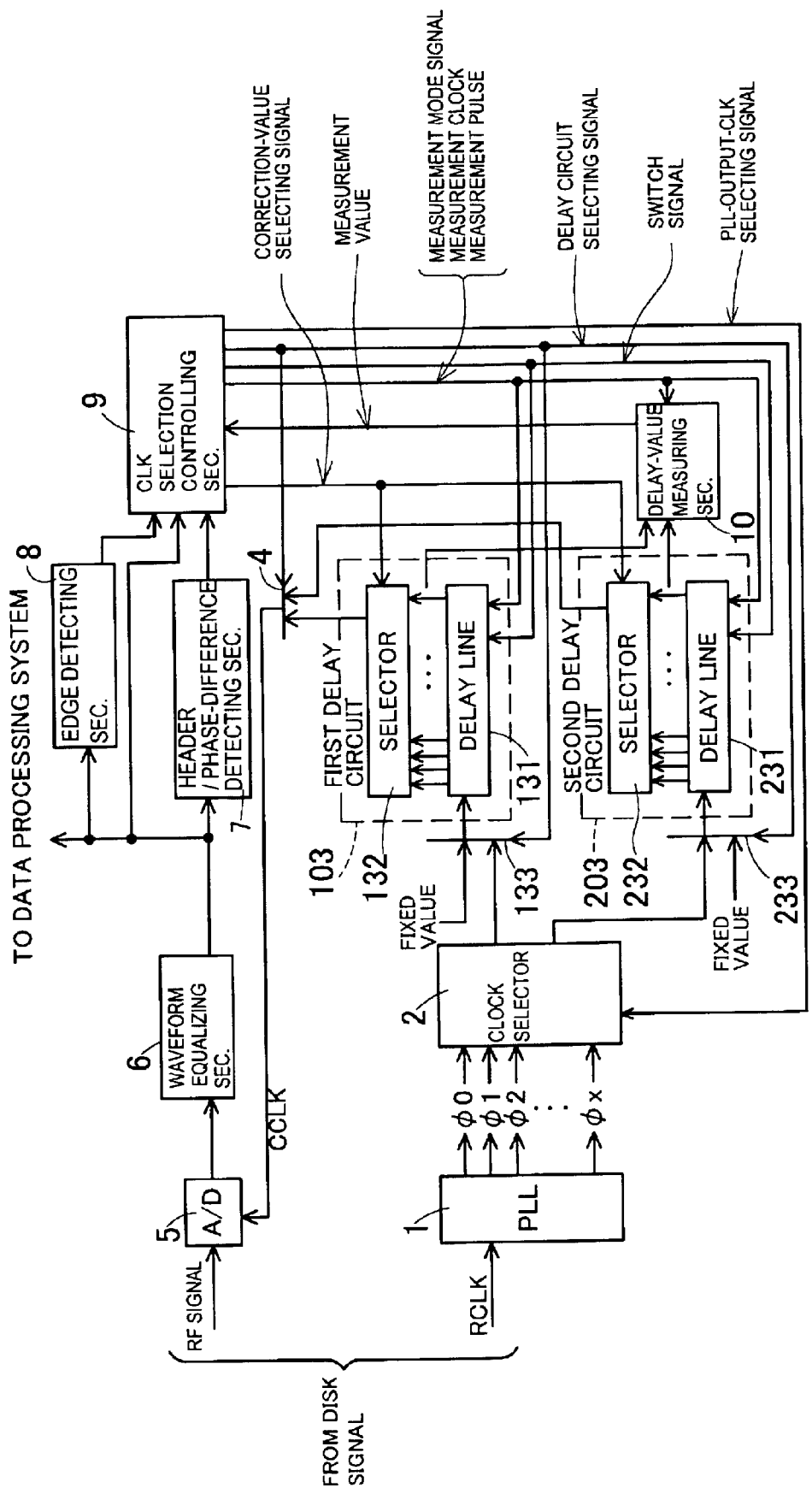
FIG. 14 is a block configuration diagram of a disk operation device directed to first embodiment.

Structure of a disk operation device directed to a second embodiment is shown in FIG. 14. This disk operation device is structured such that two sets of the delay circuit for the disk operation device directed to the first embodiment are provided. That is, the disk operation device of the second embodiment includes a first delay circuit 103 and a second delay circuit 203. These delay circuits are similar to the delay circuit 3 directed to the first embodiment in terms of structure and function. The disk operation device of this embodiment selectively uses one of the two delay circuits 103 and 203. Furthermore, as described later, the delay circuits 103 and 203 are switched appropriately.

The disk operation device of this embodiment that includes two sets of delay circuit differs from the disk operation device operation directed to the first embodiment in terms of the following points. Firstly, a clock selector 2 outputs a reference clock to a delay line 131 in a first delay circuit 103 and a reference clock to a delay line 231 in a second delay circuit 203. Not to mention, selection of a reference clock is conducted in accordance with an instruction signal from a clock-selection controlling section 9.

A switch 133 is arranged between the clock selector 2 and the delay line 131. Similarly, a switch 233 is arranged between the clock selector and the delay line 231. Both the switch 133 and the switch 233 are to let either a fixed value or an output from the clock selector 2 pass so as to input the one to the delay line 131 or 231. That is, in case the first delay circuit 103 is used, the switch 133 and the switch 233 let a clock signal and a fixed value pass, respectively. Contrarily, in case the second delay circuit 203 is used, the switch 133 and the switch 233 let a fixed value and a clock signal pass, respectively. That is, provided that a clock signal is inputted to a delay circuit not for use, it means waste of power consumption. Both the switch 133 and the switch 233 are controlled in accordance with a delay circuit selecting signal from the clock-selection controlling section 9.

Furthermore, a selector 4 is arranged at the preceding stage of an A/D converting section 5. The selector 4 is to let either an output clock from the selector 132 in the first delay circuit 103 or an output clock from the selector 232 in the second delay circuit 233 pass, selectively. Not to mention, an output from a delay circuit for use is let pass. Selection of an output clock and operation control of the switches 133 and 233 are conducted in accordance with an instruction signal from a clock-selection controlling section 9.

It should be noted that the delay-value measuring section 10 can measure actual delay values of both the delay lines 131 and 231. Other than these aspects, there is not structural difference between the disk operation device of the second embodiment and that of the first embodiment.

The disk operation of this embodiment operates as follows. It is provided that calibration of the delay lines 131 and 231 have been done by the delay-value measuring section 10. In this disk operation device, a reference clock RCLK generated by an FCM on a disk is multiplied by the PLL 1, whereby a reference clock group Ø0 through Øx are generated. It is similar to the first embodiment that one in the reference clock group is selected by the clock selector 2 and further corrected by a delay circuit.

In the disk operation device of this embodiment, the first delay circuit 103 is selected for initial stage of clock correction. That is, a delay circuit selecting signal from the clock-selection controlling section 9 brings a state such that the switch 13 lets a clock signal pass and a the switch 233 lets a fixed value pass. There is further brought a state such that the selector 4 lets an output signal from the selector 132 pass. With such state, clock correction is conducted in a manner similar to the case of the disk operation device of the first embodiment. That is, clock correction consists of two steps: a first step to select one of the reference clock group Ø0 through Øx from the PLL 1; and a second step to select one of the delay clock group ψ0 through ψn from the delay line 131. Specific methods of clock correction may be carried out in accordance with any one of the methods (1) through (4) as raised in the first embodiment.

By the way, there can occur a case such that nevertheless selection by the selector 132 reaches an end of the delay line 131, phase difference does not converge during a second step. Such a case occurs due to bad quality of an RF signal based on a phase correction pattern on a disk, and the like. Therefore, the disk operation device of the present invention includes two sets of delay circuit for coping with the above problematic situation. That is, in such situation, the second delay circuit 203 starts up and a reference clock one-stage prior to or posterior to the current reference clock is inputted to the delay circuit 203 to continue correction. More specifically, in case it reaches an input-side terminal portion of the delay line 131 (CLK ψ0 side), a reference clock one-stage prior to the present reference clock used so far is inputted to the second delay circuit 203. In case it reaches a maximum delay-side terminal portion of the delay line 131 (CLK ψn side), a reference clock one-stage posterior to the present reference clock used so far is inputted to the second delay circuit 203. In either case, initial selection by the selector 232 after switching is a reference clock a phase of which is the closest to that of an output clock from the first delay circuit 103 immediately before being switched. Thereby, clock correction can be smoothly continued to reach convergence.

Figure 15:
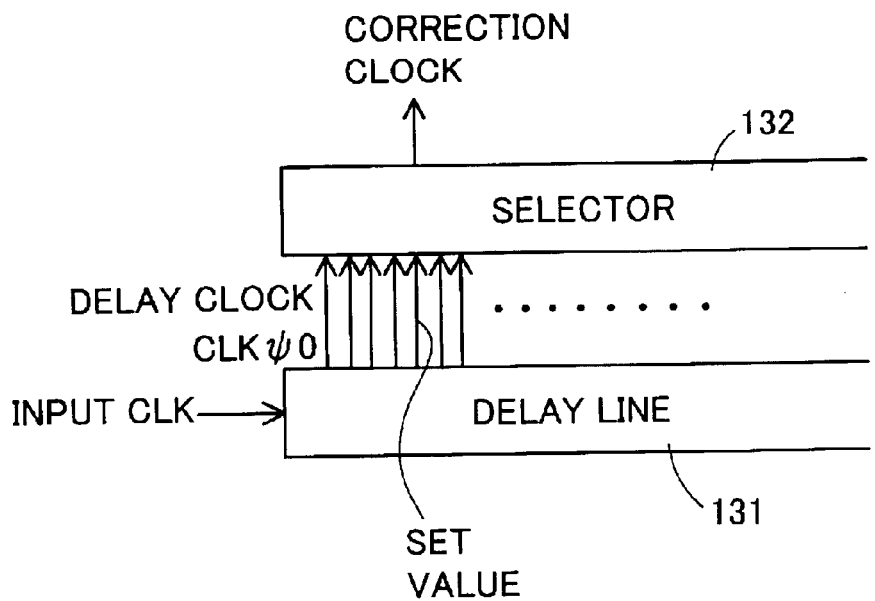
FIG. 15 is a diagram showing a set value for switching delay circuits.

Timing of switching delay circuits can be just when selection by the selector 132 reaches one terminals of the delay line 131, however, the following manner is much better. That is, as shown in FIG. 15, a setting point is set to slightly before a terminal so that delay circuits are switched when the selection reaches the setting point. Furthermore, delay circuits can be switched when the selection exceeds the setting point and continuously goes toward a terminal. This is because transition of delay clock selection at a second step does not always go for one direction due to a problem such as accuracy degree of an RF signal. Therefore, it is required to avoid switching between the two delay circuits repeatedly. Although FIG. 5 shows the input-side terminal portion only, same aspects hold true of the maximum delay-side terminal portion. Furthermore, in the above, the second delay circuit 203 can be used first at clock correction.

In the disk operation device of the first embodiment, a fist step needs to be repeated again in case selection by the selector 32 reaches a terminal portion.

As described, in the disk operation devices of these embodiments, a voltage control oscillator 14 constituted by ring oscillators is included in the PLL 1 that multiplies a reference clock RCLK based on an FCM on a disk. Thereby, a reference clock group Ø0 through Øx different in phase are obtained for multiplying a reference clock RCLK. Next, depending on phase difference with reference to an RF signal, one reference clock signal is selected from the reference clock group Ø0 through Øx. Subsequently, the delay circuit 3 conducts clock correction. Accordingly, time equivalent to phase difference of adjoining reference clocks is enough as total delay quantity of the delay line 31 in the delay circuit 3. Therefore, it is not necessary for the delay line 31 to have excessive number of stages.

That is, when the lowest data transfer rate is 10 Mbps, one cycle of a reference clock is 100 ns. In case the ring oscillator is five-stage structure, a reference clock group can consist of ten reference clocks and total delay quantity of the delay line can be 10 ns. If correction accuracy is 0.5 ns, delay line 31 can be structured with twenty stages. As to case of the second embodiment, forty stages are enough as total number of stages for the two delay lines 131 and 231. On the other hand, the conventional disk operation device using one reference clock only requires two hundred stages under same condition. Therefore, the number of stages for the delay line 31 is dramatically reduced. Thereby, unnecessary power consumption is suppressed and there is little noise problem due to saturation of clock signals. Furthermore, since the number of stages is small, frequency of a problem due to delay quantity variation of respective buffer logics that constitute a delay line is suppressed to fewer than the conventional art.

Furthermore, in the disk operation devices of these embodiments, an element provided with a switch element is used as a delay element for the delay line 31. A switch element is operated in accordance with a switch signal from the clock-selection controlling section 9. Therefore, this structure can prevent a clock signal from being transmitted to portions following an output point of a correction clock in the delay line 31. This aspect also contributes to low power consumption and suppression of noises.

In the disk operation devices of these embodiments, the delay value measuring section 10 is provided so that calibration of actual delay quantity at each delay element in the delay line can be executed. Thereby, clock correction conceived of actual delay quantity at each delay element can be executed. Therefore, convergence characteristic of clock correction is no problem. Furthermore, it is possible to conduct clock correction using an edge in user's data as well as a phase correction pattern.

In the disk operation device of the second embodiment, there are provided two sets of delay circuits so as to selectively use one of them. Therefore, even if an output point reaches a terminal portion of a delay line during clock correction, clock correction can be continued by switching to another one of the delay circuits. Therefore, even if accuracy of an RF signal is not good, clock correction can be conducted smoothly. Instead of a clock signal, a fixed value is inputted to a delay circuit not for use. Therefore, the delay circuit not for use does not waste power and cause noises.

The present invention is not limited to the embodiments described above and may of course be improved or modified in various manners within the scope and spirit of the present invention.

Figure 16:
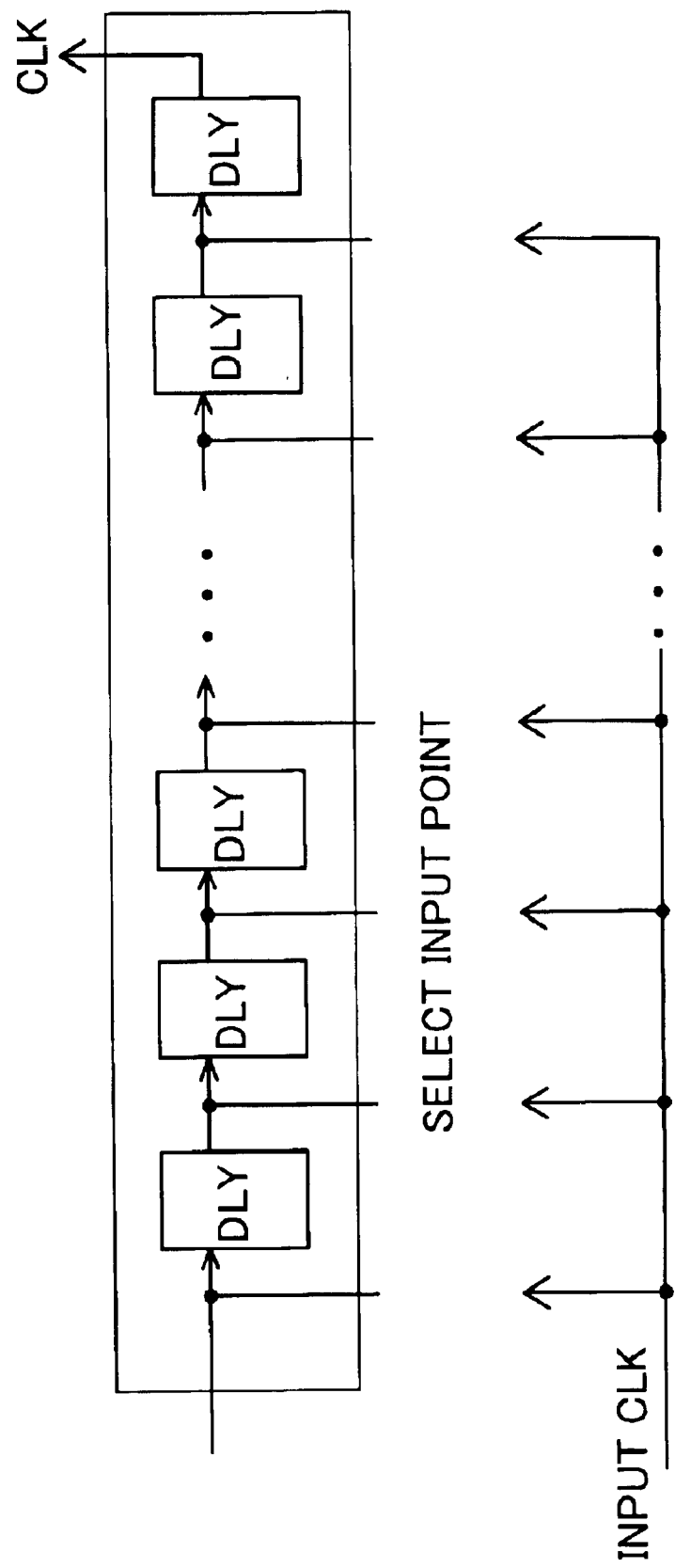
FIG. 16 is a block diagram showing a selective-input-type delay line.
Figure 17:
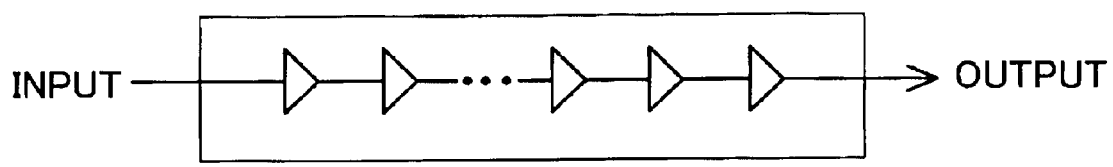
FIG. 17 is a diagram showing a conventional delay line.

For example, in the first and second embodiments, delay units with switch elements are employed for all the delay units of the delay lines 31, 131, and 231. However, it is not necessary for all of the delay units to include switch elements. One switch element can be allocated to several delay units. Similarly, subject to be measured by the delay-value measuring section 10 can be every several number of clocks. Furthermore, the delay lines 31, 131, and 231 can be input-point selection type as shown in FIG. 16 other than output-point selection type as shown in FIG. 5.

According to the present invention, it is apparent from the above description that time equivalent to phase difference of a plurality of clock signals outputted from a clock signal outputting circuit is enough as total delay quantity of a delay line. That is, it is not necessary to secure time equivalent to one cycle of a clock signal. Thereby, there can be provided a recording medium operation device and a clock signal generating device and method thereof capable of coping with a wide-range data transfer rate and securing high correction accuracy with a delay line including comparatively smaller number of stage, and advantageous in terms of low power consumption and low noise-occurrence.

What is claimed is:

1. A recoding-medium operating device for data operation to a recording medium, the recording-medium operating device comprising:
    a clock outputting circuit that outputs a plurality of clock signals that have same frequency but differ in phase one another, based on phase-information mark formed on a recording medium beforehand;
    a first selector that selects one of the plurality of the clock signals outputted from the clock outputting circuit;
    a delay circuit that receives an input of an clock signal selected by the first selector and has multi-level of delay quantity;
    a second selector that selects a delay quantity at the delay circuit;
    a phase-difference detecting section that detects phase difference between a signal reproduced from a data region on a recording medium and a clock signal; and
    a controlling section that controls selection by the first selector and selection by the second selector,
    wherein phase difference between delay quantities of the delay circuit is smaller than phase difference between clock signals of the clock outputting circuit,
    the controlling section controls selections by the first selector and the second selector so as to make phase difference detected at the phase-difference detecting section minimum, and
    data operation to a recording medium is executed based on a clock signal outputted from the delay circuit.

2. A recording-medium operating device according to claim 1, wherein the phase-difference detecting section deals either a phase-correction pattern signal or a user data signal as signal reproduced from a data region on a recording medium.

3. A recording-medium operating device according to claim 2 further comprising an edge detecting section that detects an edge of a signal reproduced from a data region on a recording medium,
    wherein the phase-difference detecting section detects a phase difference with reference to an edge detected by the edge detecting section in case a user data signal is used as a signal reproduced from a data region on a recording medium.

4. A recording-medium operating device according to claim 1 further comprising a delay quantity measuring section that measures actual delay quantity caused by the delay circuit,
    wherein the controlling section controls a selection by the second selector based on a measurement result obtained by the delay quantity measuring section.

5. A recording-medium operating device according to claim 1, wherein initial setting of delay quantity selection by the second selector is an intermediate delay quantity out of the multi-level of delay quantities that the delay circuit holds.

6. A recording-medium operating device according to claim 1,
    wherein the delay circuit comprises a plurality of delay elements in series and includes at least one switch between adjoining portion of delay elements so as to switch whether or not a clock signal is transmitted from an antecedent stage to a following stage,
    the controlling section has a function to control a switch of the delay circuit, and
    the second selector selects adjoining portions of delay elements in the delay circuit where a clock signal should be outputted.

7. A recording-medium operating device according to claim 6, wherein the controlling section turns on switches ahead an output point selected by the second selector, and turns off switches behind an output point selected by the second selector.

8. A recording-medium operating device according to claim 6, wherein the controlling section turns off switches behind an output point that corresponds to delay quantity equivalent to time of a phase difference between adjoining two clock signals outputted from the clock outputting circuit.

9. A recording-medium operating device according to claim 1,
    wherein two sets of a delay circuit and a second selector are provided, the first selector selects clock signals different by respective delay circuits of the two sets, a third selector that selects one of clock signals from two second selectors and outputs the clock signal to the phase-difference detecting section is provided between respective second selectors and the phase-difference detecting section, the controlling section has a function to control selection by the third selector, and data operation to a recording medium is conducted based on a clock signal selected by the third selector.

10. A recording-medium operating device according to claim 9 further comprising switches that are arranged between the first selector and a delay circuit of each set of delay circuit and second selector and switches whether or not clock signals are transmitted from the first selector to a corresponding delay circuit, wherein the controlling section has a function to control each of the switches, turns on a switch corresponding to a delay circuit selected by the third selector, and turns off a switch corresponding to a switch not selected by the third selector.

11. A clock signal generating device for generating a clock signal for data operation to a recording medium, the clock signal generating device comprising:

a clock outputting circuit that outputs a plurality of clock signals that have same frequency but differ in phase one another, based on phase-information mark formed on a recording medium beforehand;

a first selector that selects one of the plurality of the clock signals outputted from the clock outputting circuit;

a delay circuit that receives an input of an clock signal selected by the first selector and has multi-level of delay quantity;

a second selector that selects a delay quantity at the delay circuit;

a phase-difference detecting section that detects phase difference between a signal reproduced from a data region on a recording medium and a clock signal; and a controlling section that controls selection by the first selector and selection by the second selector, wherein phase difference between delay quantities of the delay circuit is smaller than phase difference between clock signals of the clock outputting circuit, the controlling section controls selections by the first selector and the second selector so as to make phase difference detected at the phase-difference detecting section minimum, and a clock signal outputted from the delay circuit is utilized for data operation to a recording medium.

12. A clock signal generating device according to claim 11, wherein the phase-difference detecting section deals either a phase-correction pattern signal or a user data signal as signal reproduced from a data region on a recording medium.

13. A clock signal generating device according to claim 12 further comprising an edge detecting section that detects an edge of a signal reproduced from a data region on a recording medium, wherein the phase-difference detecting section detects a phase difference with reference to an edge detected by the edge detecting section in case a user data signal is used as a signal reproduced from a data region on a recording medium.

14. A clock signal generating device according to claim 11 further comprising a delay quantity measuring section that measures actual delay quantity caused by the delay circuit, wherein the controlling section controls a selection by the second selector based on a measurement result obtained by the delay quantity measuring section.

15. A clock signal generating device according to claim 11, wherein initial setting of delay quantity selection by the second selector is an intermediate delay quantity out of the multi-level of delay quantities that the delay circuit holds.

16. A clock signal generating device according to claim 11, wherein the delay circuit comprises a plurality of delay elements in series and includes at least one switch between adjoining portion of delay elements so as to switch whether or not a clock signal is transmitted from an antecedent stage to a following stage, the controlling section has a function to control a switch of the delay circuit, and the second selector selects adjoining portions of delay elements in the delay circuit where a clock signal should be outputted.

17. A clock signal generating device according to claim 16, wherein the controlling section turns on switches ahead an output point selected by the second selector, and turns off switches behind an output point selected by the second selector.

18. A clock signal generating device according to claim 16, wherein the controlling section turns off switches behind an output point that corresponds to delay quantity equivalent to time of a phase difference between adjoining two clock signals outputted from the clock outputting circuit.

19. A clock signal generating device according to claim 11, wherein two sets of a delay circuit and a second selector are provided, the first selector selects clock signals different by respective delay circuits of the two sets, a third selector that selects one of clock signals from two second selectors and outputs the clock signal to the phase-difference detecting section is provided between respective second selectors and the phase-difference detecting section, the controlling section has a function to control selection by the third selector, and data operation to a recording medium is conducted based on a clock signal selected by the third selector.

20. A clock signal generating device according to claim 19 further comprising switches that are arranged between the first selector and a delay circuit of each set of delay circuit and second selector and switches whether or not clock signals are transmitted from the first selector to a corresponding delay circuit, wherein the controlling section has a function to control each of the switches, turns on a switch corresponding to a delay circuit selected by the third selector, and turns off a switch corresponding to a switch not selected by the third selector.

21. Clock signal generating method for generating a clock signal for data operation to a recording medium, the clock signal generating method comprising steps of:

clock signal outputting step where a clock outputting circuit outputs a plurality of clock signals that have same frequency but differ in phase one another based on phase-information mark formed on a recording medium beforehand;

clock-signal selecting step where a first selector selects one of the plurality of the clock signals outputted from the clock outputting circuit;

delay step where a delay circuit having multi-level of delay quantity receives an input of an clock signal selected by the first selector and outputs a delayed signal with being selected a level of delay quantity by a second selector;

phase-difference detecting step where a phase-difference detecting section detects phase difference between a signal reproduced from a data region on a recording medium and a clock signal; and controlling step where selection by the first selector and selection by the second selector are controlled to make phase difference detected at the phase-difference detecting section minimum, wherein a clock signal outputted from the delay circuit is utilized for data operation to a recording medium, and phase difference between delay quantities of the delay circuit is smaller than phase difference between clock signals of the clock outputting circuit.

* * * * *